US012561163B2

(12) United States Patent
Antonik

(10) Patent No.: US 12,561,163 B2
(45) Date of Patent: Feb. 24, 2026

(54) LONG RUNNING OPERATIONS IMPLEMENTATION

(71) Applicant: Google LLC, Mountain View, CA (US)

(72) Inventor: Aliaksandr Antonik, Erie, CO (US)

(73) Assignee: Google LLC, Mountain View, CA (US)

( * ) Notice: Subject to any disclaimer, the term of this patent is extended or adjusted under 35 U.S.C. 154(b) by 423 days.

(21) Appl. No.: 17/551,748

(22) Filed: Dec. 15, 2021

(65) Prior Publication Data

US 2023/0185602 A1    Jun. 15, 2023

(51) Int. Cl.
| | |
|---|---|
| *G06F 9/48* | (2006.01) |
| *G06F 9/455* | (2018.01) |
| *G06F 9/54* | (2006.01) |
| *G06F 11/30* | (2006.01) |

(52) U.S. Cl.
CPC ............ G06F 9/4843 (2013.01); G06F 9/485 (2013.01); G06F 9/54 (2013.01); G06F 11/3051 (2013.01); G06F 2009/45591 (2013.01); G06F 9/4881 (2013.01)

(58) Field of Classification Search
CPC ...... G06F 9/4843; G06F 9/485; G06F 9/4881; G06F 2009/45591
See application file for complete search history.

(56) References Cited

U.S. PATENT DOCUMENTS

| | | | | |
|---|---|---|---|---|
| 11,418,582 | B1 * | 8/2022 | Swain | .................... H04L 67/145 |
| 11,513,921 | B1 * | 11/2022 | Yadav | ................. G06F 11/1435 |
| 12,210,909 | B2 * | 1/2025 | Ni | ............................ G06F 9/505 |
| 2020/0067763 | A1 * | 2/2020 | Vytla | .................... H04L 41/0806 |
| 2020/0099614 | A1 * | 3/2020 | Vutharkar | ................. G06F 7/14 |
| 2021/0084103 | A1 * | 3/2021 | Smith | .................. H04L 67/1097 |
| 2022/0107842 | A1 * | 4/2022 | Jiang | ...................... G06F 9/5061 |
| 2022/0121466 | A1 * | 4/2022 | Gasperowicz | .......... G06F 9/455 |
| 2022/0129155 | A1 * | 4/2022 | Kasso | ................. G06F 11/1464 |
| 2023/0058477 | A1 * | 2/2023 | Jiang | ......................... G06F 8/65 |

OTHER PUBLICATIONS

Unknown Author, "Oracle Database Backup and Recovery User's Guide", Feb. 2021 (Year: 2021).*
Unknown Author, "Oracle Secure Backup Administrator's Guide—Release 12.1", Dec. 2016 (Year: 2016).*
Venky Rao, "Docker and RMAN", venkyrao.medium.com/docker-and-rman-a93f256126e5Dec 25, 2019 (Year: 2019).*
Steveswinsburg, "Oracle Database Container Images",github.com/oracle/docker-images/blob/main/OracleDatabase/SingleInstance/README.md retrieved using wayback machine from Sep. 20, 2021. (Year: 2021).*

(Continued)

*Primary Examiner* — Lewis A Bullock, Jr.
*Assistant Examiner* — Kevin X Lu
(74) *Attorney, Agent, or Firm* — Lerner David LLP

(57) ABSTRACT

A system for processing database requests includes an operator module operable to receive a request requiring a long running operation, and assign an operation identification (ID) to the long running operation; and a database module for receiving the request and the operation ID, the database module including a database daemon for launching the long running operation, storing a state of the long running operation, and reporting a status of the long running operation.

18 Claims, 5 Drawing Sheets

(56) References Cited

OTHER PUBLICATIONS

Unknown author ("Rumon—Universal goroutine monitor using pprof and termui", github.com/becheran/roumon, Dec. 4, 2021 (retrieved using web.archive.org on specific date)) ( (Year: 2021).*

Potineni et al. Oracle Database Backup and Recovery User's Guide 18c. pp. 1-400. Feb. 1, 2021 (Feb. 1, 2021), Retrieved from the Internet: <https://docs.oracle.com/en/database/oracle/oracle-database/18/bradv/database-backup-and-recovery~users-guide.pdf>.

Potineni et al. Oracle Database Backup and Recovery User's Guide 18c. pp. 401-802. Feb. 1, 2021 (Feb. 1, 2021), Retrieved from the Internet: <https://docs.oracle.com/en/database/oracle/oracle-database/18/bradv/database-backup-and-recovery-users-guide.pdf>.

Anonymous. El Carro extends the flexibility and choices for Oracle Databases on Kubernetes: Google Open Source Blog. Sep. 2, 2021 (Sep. 2, 2021), 4 pages. Retrieved from the Internet: <https://opensource.googleblog.com/2021/08/el-carro-extends-flexibility-and-choices-for-Oracle-databases-on-Kubernetes.html>.

Anonymous. Modernizing Oracle operations with Kubernetes and El Carro: Google Open Source Blog. May 13, 2021 (May 13, 2021), 4 pages. Retrieved from the Internet: <https://opensource. googleblog. com/2021/05/modernizing-oracle-operations-with-kubernetes-el-carro.html>.

Sayfan. Mastering Kubernetes. pp. 1-400, Jan. 1, 2017 (Jan. 1, 2017), Retrieved from the Internet: <http://ndl.ethernet.edu.et/bitstream/123456789/40210/2/115.Gigi%20Sayfan.pdf>.

International Search Report and Written Opinion for International Application No. PCT/US2022/052548 dated Mar. 2, 2023. 13 pages.

* cited by examiner

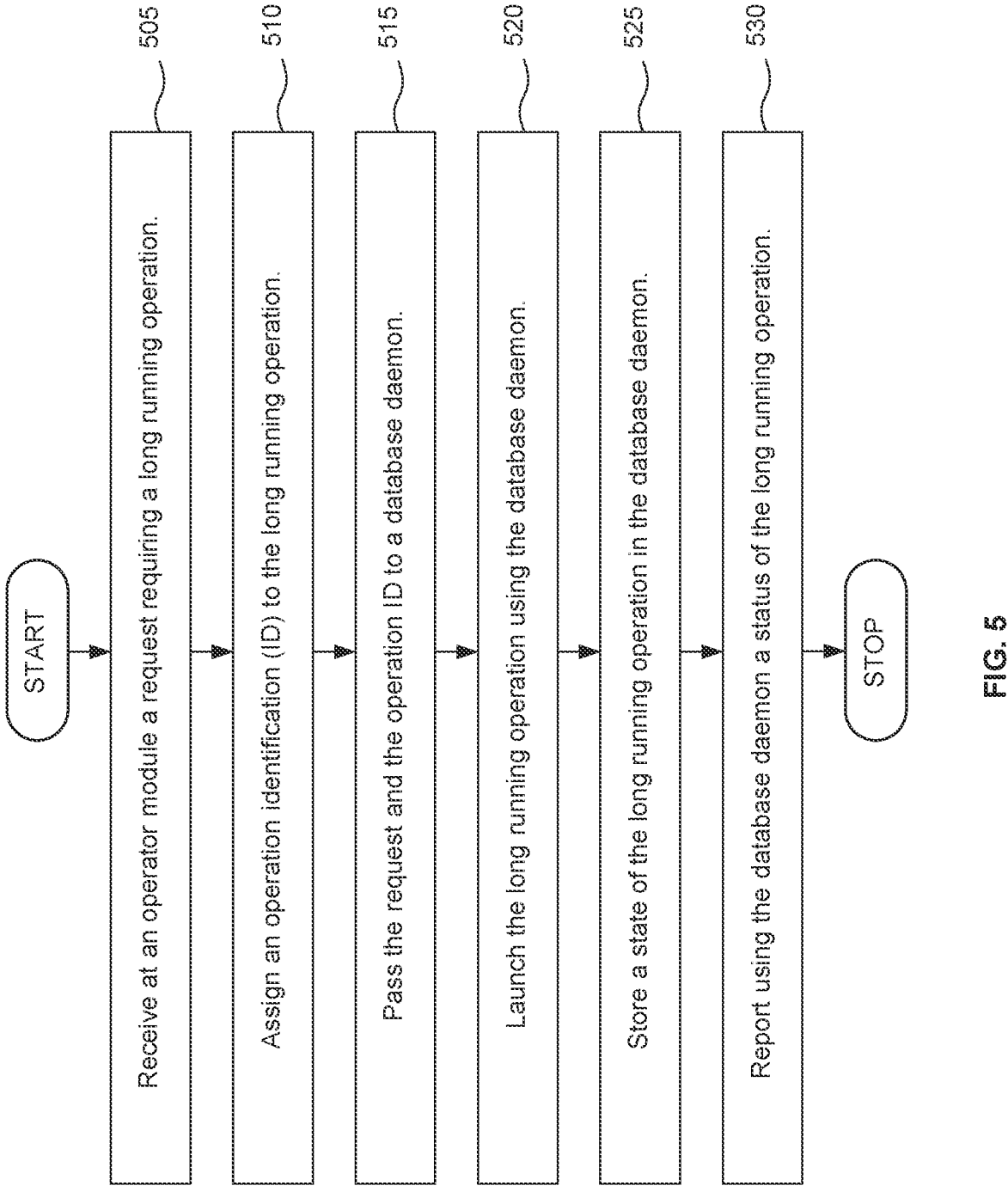

START

505 — Receive at an operator module a request requiring a long running operation.

510 — Assign an operation identification (ID) to the long running operation.

515 — Pass the request and the operation ID to a database daemon.

520 — Launch the long running operation using the database daemon.

525 — Store a state of the long running operation in the database daemon.

530 — Report using the database daemon a status of the long running operation.

STOP

FIG. 5

LONG RUNNING OPERATIONS IMPLEMENTATION

BACKGROUND

A long running operation is a software operation that takes a considerable amount of time to complete. The time that it takes to complete the long running operation is considered considerable because the user is blocked from performing other operations while waiting for the long running operation to complete.

BRIEF SUMMARY

It has been recognized that that there is a strong preference to execute long running operations without requiring users to wait for the long running operations to complete before performing other operations. That is, there is a strong desire to execute long running operations asynchronously.

In view of the desire execute long running operations asynchronously, the presently disclosed technology is provided. In accordance with the presently disclosed technology, long running operations may be run asynchronously in the context of modular software database systems, such as a pod-based database system.

In one aspect, the technology provides a system for processing database requests. The system includes an operator module operable to receive a request requiring a long running operation, and assign an operation identification (ID) to the long running operation; and a database module for receiving the request and the operation ID, the database module having a database daemon for launching the long running operation, storing a state of the long running operation, and reporting a status of the long running operation.

In another aspect, the technology provides a method for processing database requests. The method includes receiving at an operator module a request requiring a long running operation; assigning an operation identification (ID) to the long running operation; passing the request and the operation ID to a database module having a database daemon; launching the long running operation using the database daemon; storing a state of the long running operation in the database daemon; and reporting using the database daemon a status of the long running operation.

In still another aspect, the technology provides a non-transitory computer-readable medium having stored thereon a computer-readable program for performing a method for processing database requests. The method includes receiving at an operator module a request requiring a long running operation; assigning an operation identification (ID) to the long running operation; passing the request and the operation ID to a database module having a database daemon; launching the long running operation using the database daemon; storing a state of the long running operation in the database daemon; and reporting using the database daemon a status of the long running operation.

BRIEF DESCRIPTION OF THE DRAWINGS

The accompanying drawings are not intended to be drawn to scale. Also, for purposes of clarity not every component may be labeled in every drawing. In the drawings:

FIG. 5 is a flow chart depicting an illustrative flow of operations for servicing a database request in the system of FIG. 3.

DETAILED DESCRIPTION

Examples of systems and methods are described herein. It should be understood that the words "example," "exemplary" and "illustrative" are used herein to mean "serving as an example, instance, or illustration." Any embodiment or feature described herein as being an "example," "exemplary" or "illustration" is not necessarily to be construed as preferred or advantageous over other embodiments or features. In the following description, reference is made to the accompanying figures, which form a part thereof. In the figures, similar symbols typically identify similar components, unless context dictates otherwise. Other embodiments may be utilized, and other changes may be made, without departing from the spirit or scope of the subject matter presented herein.

The example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

Figure 1:
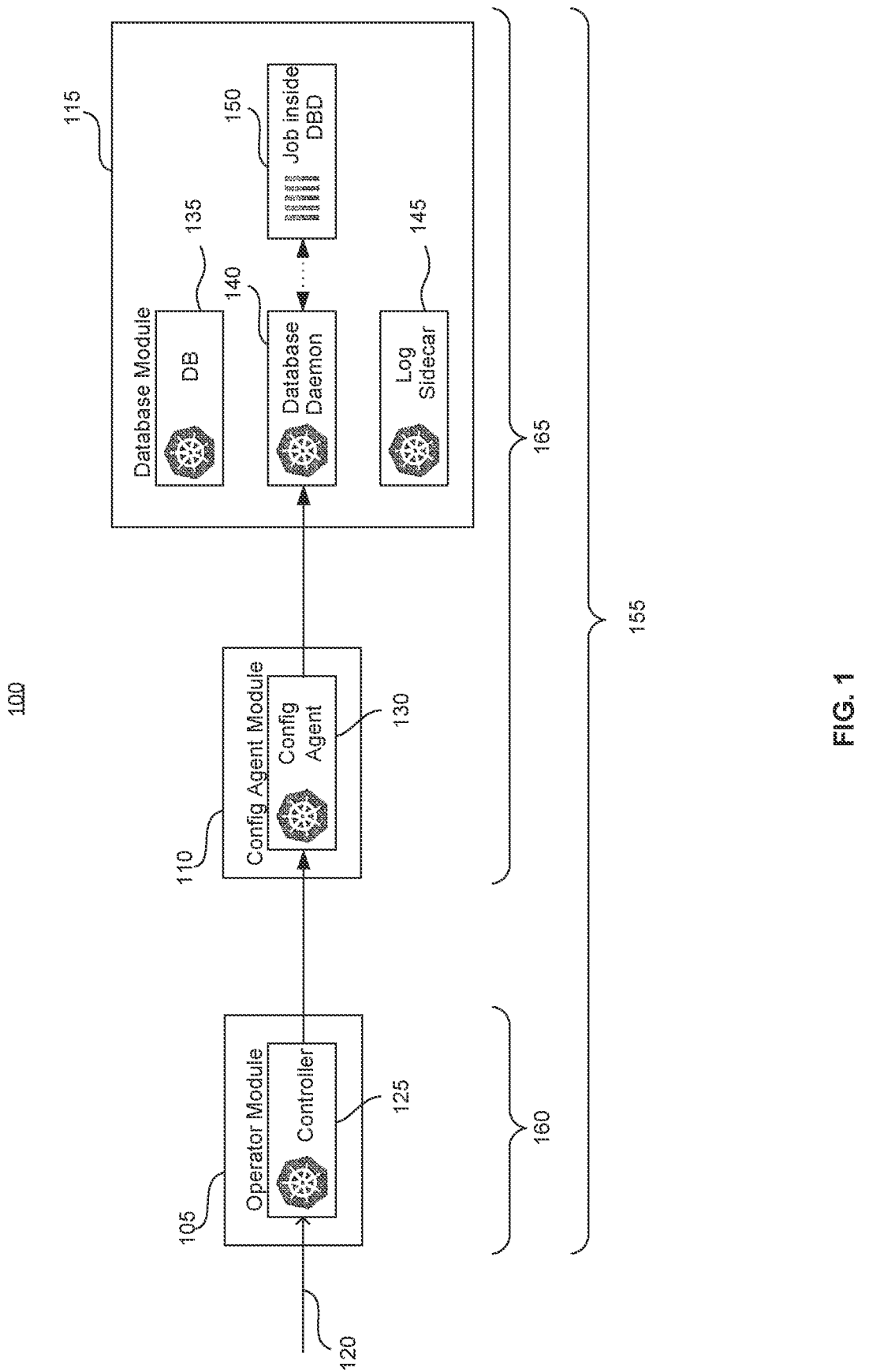
FIG. 1 is a functional block diagram of a modular-software based system for processing database requests.

FIG. 1 is a functional block diagram of a modular-software based system 100 for processing database requests. As can be seen from the figure, the system 100 may include three software modules, an operator module 105, a configuration agent module 110, and a database module 115. The operator module 105 is configured to receive a database request 120 (e.g., from a client device—not shown) and pass the request to the configuration agent module 110 (e.g., through a remote procedure call (RPC) such as a gRPC). The configuration agent module 110 may, in turn, pass the request to the database module 115 (e.g., through an RPC such as a gRPC), and the database module 115 may service the request. For example, a user may wish to back up a database. In such a case, the user may generate request 120 consistent with the user's desire, and transmit the request 120 to the operator module 105. The operator module 105 transmits the request to the configuration agent module 110 which, in turn, transmits the request to the database module 115, where the operation of backing up the database is performed.

Each of the modules of system 100 may be provided in many different forms. For one, each of the operator module 105, the configuration agent module 110, and the database module 115 may be in the form of a software point of delivery (POD). A software POD is a deployable software module that delivers a service. That is, a POD is a module of network, compute, storage, and application components that work together to deliver network services. PODs are often described in term of containers, a container being a standard unit of software that packages up application code and all of the application code's dependencies so that the application runs quickly and reliably form one computing environment to another. In terms of containers, a POD is a group of one or more containers, with shared storage and network resources, and a specification for how to run the containers. A POD's contents are co-located and co-scheduled, and run in a shared context, such that the POD models an application-specific logical host. One example of a POD is a KUBERNETES POD.

As can be seen from FIG. 1, the operator module 105 may include a single container, a controller container 125. The configuration agent module 110 may include a single container, a configuration agent container 130. The database module 115 may include a multiple of containers, including at least a database container 135, a database daemon container 140, a log sidecar 145, and a job container 150. By way of example, the database daemon container 140 may correspond to a database daemon that services request 120 by employing the job container 150 to search for and retrieve data from database container 135, while the log sidecar container 145 executes to track events that occur during such servicing.

In addition, it should be noted that the modules of system 100 may be in the form of a cluster 155. The cluster 155 is a set of nodes, with each node being either a physical machine or a virtual machine. The cluster may include at least one master node and at least one worker node, although other cluster configurations may be employed, such as a configuration in which the cluster 155 has a single node operating as both a master and a worker. In one embodiment, the operator module 105 is located in a master node 160 while the configuration agent module 110 and database module 115 are both located in a single worker node 165. One possible configuration for cluster 155 is a KUBERNETES cluster. In any event, the cluster 155 allows the containers 125, 130, 135, 140, 145, and 150 to run across multiple machines and environments, including virtual, physical, cloud-based, and on-premises. Also, the cluster 155 does not restrict containers 125, 130, 135, 140, 145, and 150 to a specific operating system. Rather, the containers 125, 130, 135, 140, 145, and 150 are able to share operating systems and run anywhere.

It should be further noted that the configuration agent module 110 of system 100 is optional. That is, in an alternative embodiment, the cluster 155 may include only the operator module 105 and the database module 115, with the operator module 105 receiving request 120 and passing the request 120 directly to the database module 115, e.g., by an RPC such as a gRPC sent directly from the operator module 105 to the database module 115.

Figure 2:
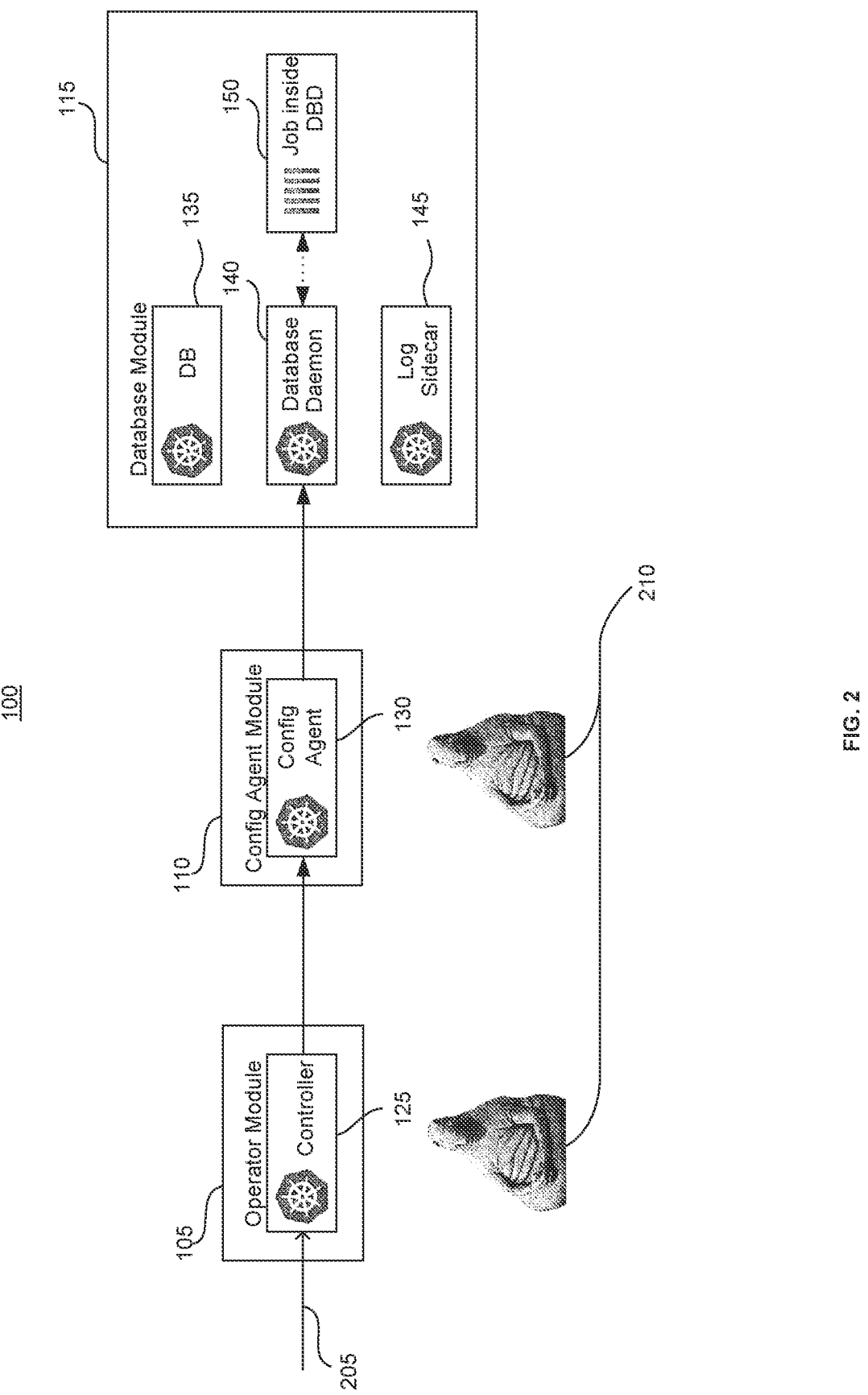
FIG. 2 is a functional block diagram illustrating how executing a requested operation on the system of FIG. 1 may block a user from performing other operations until the requested operation is completed.

Having described the FIG. 1 system in general, synchronous operation of the FIG. 1 system will not be described with reference to FIG. 2. FIG. 2 is a functional block diagram illustrating how executing a requested operation on system 100 of FIG. 1 may block a user from performing of other operations until the requested operation is completed. In the depicted example of FIG. 2, when a request 205 requiring a long running operation is received at the operator module 105 and is relayed to the database module 115, the synchronous operation of the system 100 demands that further requests requiring operations on database module 115 cannot be honored until the long running operation is complete due to, for example, the number of requests being concurrently serviced reaching a maximum. Thus, the operator module 105 and configuration agent module 110 must wait for the long running operation to complete before taking on additional work, resulting in wasted time and lost productivity, as symbolized by caricatures 210.

Further, synchronous operation may present a problem when it is necessary to restart the operator module 105 or move the operator module 105 to a different node. That is, during synchronous operation, if the lifetime of the operator module 105 is shorter than the amount of time it takes to complete a long running operation the integrity of system 100 may be compromised.

Figure 3:
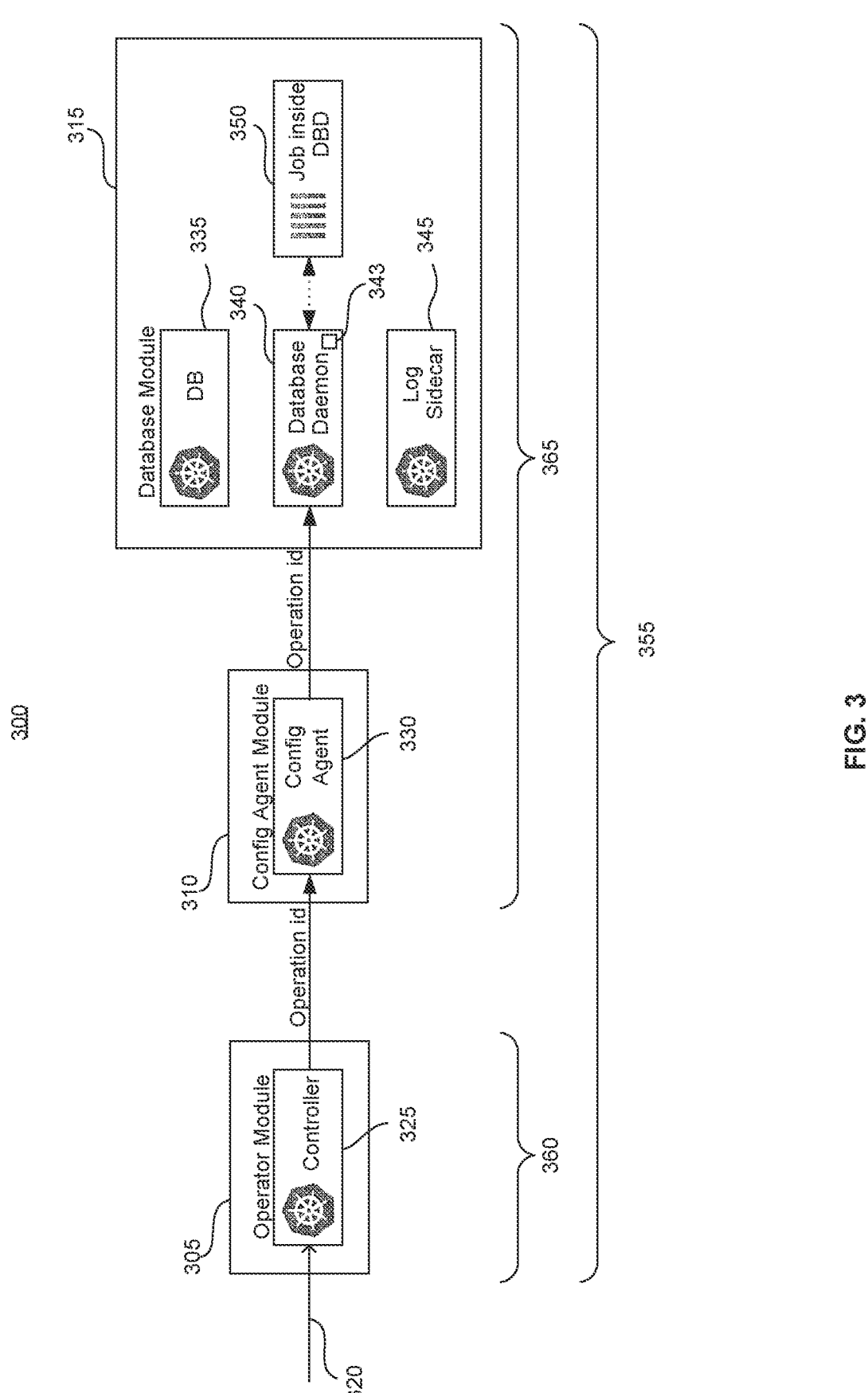
FIG. 3 is a functional block diagram of a modular-software based system for processing database requests while avoiding at least the blocking illustrated in FIG. 2.

In order to avoid delays like those discussed in connection with FIG. 2 and problems caused by restarting or moving the operator module 105, the system of FIG. 3 is provided. FIG. 3 is a functional block diagram of a modular-software based system 300 for processing database requests while avoiding the blocking illustrated in FIG. 2 and problems caused by restarting or moving the operator module 105. As can be seen from FIG. 3, the system 300 may include three software modules, an operator module 305, a configuration agent module 310, and a database module 315. The operator module 305 is configured to receive a database request 320 (e.g., from a client device—not shown), generate a unique operation identification (ID) for an operation necessitated by the request 120, and pass the request and operation ID to the configuration agent module 310 (e.g., through a remote procedure call (RPC) such as a gRPC). The configuration agent module 310 may, in turn, pass the request and operation ID to the database module 315 (e.g., through an RPC such as a gRPC), and the database module 315 may service the request. For example, a user may wish to back up a database. In such a case, the user may generate request 320 consistent with the user's desire, and the request 320 is transmitted to the operator module 305. The operator module 305 generates an operation ID for the database backup operation necessitated by the request 320, and then transmits the request and operation ID to the configuration agent module 310 which, in turn, transmits the request and operation ID to the database module 315 where the operation of retrieving the requested data is performed.

Regarding the request and operation ID, it should be noted that a request may necessitate a multiple of operations. Moreover, it should be noted that an operation ID may be provided for each one of multiple operations necessitated by a request. Still further, it should be noted that operation IDs may be provided only for those operations that are long running operations.

In any event, each of the modules of system 300 may be provided in many different forms. For one, each of the operator module 305, the configuration agent module 310, and the database module 315 may be in the form of a software POD. Moreover, each of the operator module 305, the configuration agent module 310, and the database module 315 may include one or more software containers. As can be seen from FIG. 3, the operator module 305 may be a POD that includes a single container, a controller container 325. The configuration agent module 310 may be a POD that includes a single container, a configuration agent container 330. The database module 315 may be a POD that includes a multiple of containers, including at least a database container 335, a database daemon container 340, a log sidecar 345, and a job container 350. By way of example, the database daemon container 340 may correspond to a database daemon that services request 320 by employing the job container 350 to search for and retrieve data from database container 335, while the log sidecar container 345 executes to track events that occur during such servicing.

Notably, the database daemon container 340 is configured for asynchronous operation. In this regard, the database daemon container 340 may include a database daemon 343 that is operable to receive a request (e.g., request 320, relayed by configuration agent module 310) along with an operation ID associated with an operation necessitated by the request (e.g., operation ID for request 320 as relayed by configuration agent module 310), launch the operation asynchronously (e.g., as a goroutine), and store the status of the operation in association with the operation ID. Further, the database daemon 343 is operable to report the status of the operation to the configuration agent module 310 or operator module 305, a report being made upon any one or more of the operation being launched, the operation being completed, or a status request being received at the database daemon 343. In this manner when a request includes a long running operation, the database daemon 343 launches the long running operation and reports to the configuration agent module 310 or operator module 305 when the long running operation is complete, thereby freeing up the operator module 305 and configuration agent module 310 to honor further requests before the long running operation is complete.

In addition, it should be noted that the modules of system 300 may be in the form of a cluster 355. The cluster 355 is a set of nodes which include at least one master node and at least one worker node, with each node being either a physical machine or a virtual machine. In one embodiment, the operator module 305 is located in a master node 360 while the configuration agent module 310 and database module 315 are both located in a single worker node 365. One possible configuration for cluster 355 is a KUBERNETES cluster. In any event, the cluster 355 allows the containers 325, 330, 335, 340, 345, and 350 to run across multiple machines and environments, including virtual, physical, cloud-based, and on-premises. Also, the cluster 355 does not restrict containers 325, 330, 335, 340, 345, and 350 to a specific operating system. Rather, the containers 325, 330, 335, 340, 345, and 350 are able to share operating systems and run anywhere.

It should be further noted that the configuration agent module 310 of system 300 is optional. That is, in an alternative embodiment, the cluster 355 may include only the operator module 305 and the database module 315, with the operator module 305 receiving request 320 and an operation ID for an operation necessitated by request 320 and passing the request 320 and operation ID directly to the database module 315, e.g., by an RPC such as a gRPC sent directly from the operator module 305 to the database module 315. Also, when the configuration agent module 310 is not included in the system 300, the database daemon 343 is operable to report operation statuses to the operator module 305, a report being made upon any one or more of an operation being launched, an operation being completed, or a status request being received at the database daemon 343. In this manner when a request includes a long running operation, the database daemon 343 launches the long running operation and reports to the operator module 305 when the long running operation is complete, thereby freeing up the operator module 305 to honor further requests before the long running operation is complete.

Figure 4:
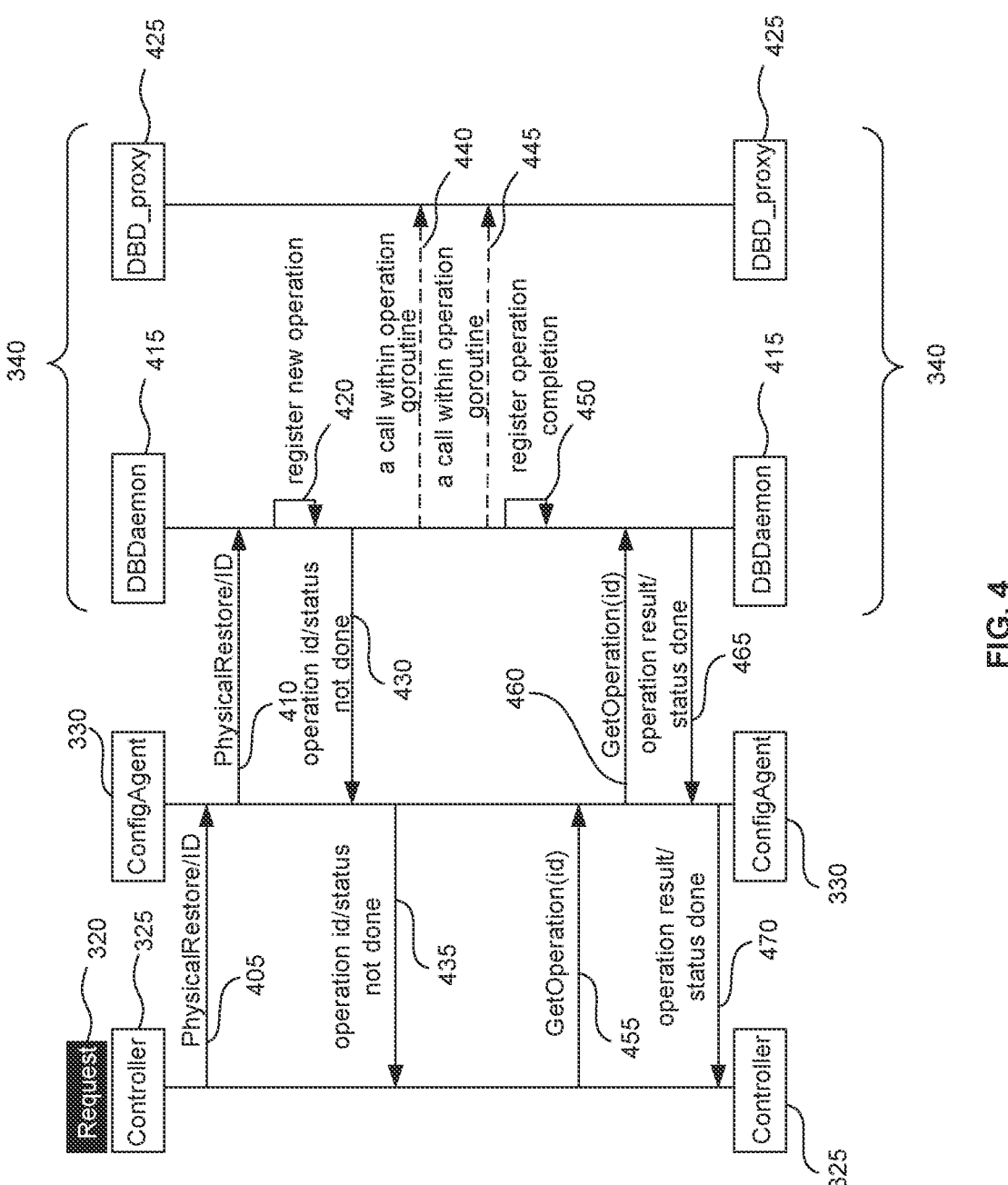
FIG. 4 is a sequence diagram showing an illustrative sequence of operations between components of the system of FIG. 3.

Turning now to FIG. 4, the figure shows a sequence diagram for an illustrative sequence of operations between components of the system 300 of FIG. 3. The sequence diagram of FIG. 4 is shown in the context of a physical restore type of long running operation, although upon review of FIG. 4 those skilled in the art will readily appreciate how the sequence of operations of FIG. 4 may be applied to other types of long running operations. As can be seen from FIG. 4, when request 320 is a physical restore request and is received at controller container 325, the controller container 325 generates an operation ID for a physical restore operation necessitated by the request, and passes the physical restore request and operation ID to the configuration agent container 330, e.g., by making a gRPC call 405 to the configuration agent container 330. The configuration agent container 330, in turn, passes the physical restore request and operation ID to the database daemon container 340, e.g., by making a gRPC call 410 to the database daemon container 340. The physical restore request and operation ID are received at a database daemon 415 of the database daemon container 340, and the database daemon 415 services the physical restore request.

To service the physical restore request, the database daemon 415 may register the physical restore operation as a new operation by performing a register new operation 420, and then launch a goroutine to carry out the operation. The register new operation 420 may involve defining a location to store state parameters of the physical restore operation, associating the location with the operation ID, and setting an initial completion status of the physical restore operation to "not done." Further, in some embodiments, the register new operation 420 is followed by an operation of sending from the database daemon 415 to the configuration agent 330 a status communication 430 including the operation ID and an indication that the operation is not done. The status communication 430 may be relayed from the configuration agent container 330 to the controller container 325 by a status communication 435.

The goroutine by which the physical restore operation is executed, may make calls to a database daemon proxy 425. To illustrate, two such goroutine calls are shown, a first goroutine call 440 and a second goroutine call 445, although it should be noted that there may be any number of goroutine calls, or no goroutine calls. In any event, when the physical restore operation is complete the database daemon 415 may make a record of the completion by performing a register operation completion 450.

As the physical restore operation is being serviced by the database daemon 415, the controller container 325 and configuration agent container 330 may receive other requests and forward them to the database daemon 415 for servicing. Also, the controller container 325 may generate status inquiries—either automatically or in response to a user command—identifying the physical restore operation by its operation ID, and send the status inquiries to the configuration agent container 330 (e.g., by making a gRPC call 455). In response, the configuration agent container 330 may send a corresponding status inquiry, identifying the physical restore operation by its operation ID, to the database daemon 415 (e.g., by making a gRPC call 460). Upon receiving a status inquiry from the configuration agent container 330, the database daemon 415 may respond to the configuration agent container (e.g., by sending from the database daemon 415 to the configuration agent container 330 a status communication 465 including an operation result and an indication that the operation is done, and optionally including the operation ID). The database daemon's response to the configuration agent container 330 status inquiry may be relayed from the configuration agent container 330 to the controller container 325 (e.g., by sending from the configuration agent container 330 to the controller container 325 a status communication 470 including an operation result and an indication that the operation is done, and optionally including the operation ID).

Having described the illustrative operation sequence of FIG. 4, it should be noted that the sequence is described for an embodiment in which the system 300 includes a configuration agent container 330. However, a similar operation sequence may be performed in a system that does not include a configuration agent container, and upon review of FIG. 4 those skilled in the art can readily derive a corresponding sequence of operations for a system that does not include a configuration agent container. For example, an operation sequence applicable to a system not including a configuration agent container may be realized by replacing all communications of FIG. 4 that are relayed by the configuration agent container 330 with direct communications between the controller container 325 and the database daemon 415.

Referring now to FIG. 5, the figure is a flow chart depicting an illustrative flow of operations for servicing a database request in the system 300 of FIG. 3. As can be seen from FIG. 5, servicing a database request may begin with receiving at an operator module, e.g., operator module 305, a request requiring a long running operation (step 505). The long running operation may be assigned an operation identification (ID) (step 510), and the request and the operation ID may be passed to a database daemon (step 515), e.g., passed to database daemon 340. Next, the database daemon launches the long running operation (step 520) and stores a state of the long running operation in the database daemon (step 525). Further, the status of the long running operation may be reported by the database daemon (step 530)—either automatically or in response to a user request—so that a notification may be provided, e.g., to operator module 305, when the long running operation is complete.

Embodiments of the present technology include, but are not restricted to, the following.

(1) A system for processing database requests, including an operator module operable to receive a request requiring a long running operation, and assign an operation identification (ID) to the long running operation; and a database module for receiving the request and the operation ID, the database module having a database daemon for launching the long running operation, storing a state of the long running operation, and reporting a status of the long running operation.

(2) The system according to (1), wherein the operator module includes a software point of delivery (POD) including a controller.

(3) The system according to (2), wherein the controller is in the form of a software container.

(4) The system according to (1), wherein the database module includes a database POD.

(5) The system according to (4), wherein the database POD includes the database daemon, a database, and a log sidecar.

(6) The system according to (5), wherein the database daemon is included in a database daemon software container, and the database and the log sidecar are each in the form of a software container.

(7) The system according to (1), further including a configuration module for receiving the request and the operation ID from the operator module and relaying the request and the operator ID to the database module.

(8) The system according to (7), wherein reporting the status of the long running operation includes reporting the status of the long running operation to the configuration module.

(9) The system according to (1), wherein reporting the status of the long running operation includes reporting an operation result and a done status.

(10) The system according to (1), wherein the operator module and the database module run on a single physical machine.

(11) The system according to (1), wherein the operator module and the database module run across multiple machines.

(12) The system according to (11), wherein the multiple machines run multiple operating systems.

(13) A method for processing database requests, including receiving at an operator module a request requiring a long running operation; assigning an operation identification (ID) to the long running operation; passing the request and the operation ID to a database module having a database daemon; launching the long running operation using the database daemon; storing a state of the long running operation in the database daemon; and reporting using the database daemon a status of the long running operation.

(14) The method according to (13), wherein the operator module includes a software point of delivery (POD) including a controller.

(15) The method according to (14), wherein the controller is in the form of a software container.

(16) The method according to (13), wherein the database POD includes the database daemon, a database, and a log sidecar.

(17) The method according to (16), wherein the database daemon is included in a database daemon software container, and the database and the log sidecar are each in the form of a software container.

(18) A non-transitory computer-readable medium having stored thereon a computer-readable program for performing a method for processing database requests, the method including receiving at an operator module a request requiring a long running operation; assigning an operation identification (ID) to the long running operation; passing the request and the operation ID to a database module having a database daemon; launching the long running operation using the database daemon; storing a state of the long running operation in the database daemon; and reporting using the database daemon a status of the long running operation.

(19) The computer-readable medium according to (18), wherein the database module includes a software point of delivery (POD).

(20) The computer-readable medium according to (19), wherein the database daemon is included in a database daemon software container.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description should be taken by way of illustration rather than by way of limitation of the subject matter defined by the claims.

The invention claimed is:

1. A system for processing database requests, comprising:
a cluster including at least one physical machine and being configured to implement a master node having an operator module in the form of a first point of delivery (POD), the operator module comprising a controller container operable to receive a request requiring at least one long running operation, assign an operation identification (ID) to the long running operation, and communicate the request and operation ID in the form of a remote procedure call (RPC), wherein when the request necessitates a multiple of operations the controller container assigns respective operation IDs to those of the operations that are long running operations and only to those of the operations that are long running operations; and a worker node having a database module in the form of a second POD for receiving the request and the operation ID, the database module comprising a database daemon container for launching the long running operation, storing a state of the long running operation, and reporting a status of the long running operation, wherein the database module further comprises a database container, a log sidecar container, and a job container, and wherein the database daemon container performs servicing of the request by employing the job container to search for and retrieve data from the database container while the log sidecar container tracks events that occur during the servicing, wherein the database daemon container is operable to receive the request and operation ID, register the long running operation as a new operation by performing a register new operation, launch the long running operation as a goroutine, and report the status of the long running operation to the master node automatically upon completion of the long running operation, with the report including the operation ID, and wherein performing the register new operation comprises defining a location to store state parameters of the long running operation, associating the location with the operation ID, and setting an initial completion status of the long running operation to not done.

2. The system according to claim 1, wherein the worker node further comprises a configuration module having a configuration agent container for receiving the request and the operation ID from the controller container and relaying the request and the operator ID to the database daemon container via an RPC.

3. The system according to claim 2, wherein reporting the status of the long running operation comprises reporting the status of the long running operation to the configuration agent container.

4. The system according to claim 1, wherein reporting the status of the long running operation comprises reporting an operation result and a done status.

5. The system according to claim 1, wherein the operator module and the database module run on a single physical machine.

6. The system according to claim 1, wherein the operator module and the database module run across multiple machines.

7. The system according to claim 6, wherein the multiple machines run multiple operating systems.

8. The system according to claim 1, wherein the cluster is a Kubernetes cluster, the operator module is in the form of a first Kubernetes POD, and the database module is in the form of a second Kubernetes POD.

9. The system according to claim 1, wherein the database daemon container is operable to receive the request and operation ID in the form of a long running operation gRPC, and report the status of the long running operation in response to receipt of a status gRPC generated automatically or in response to a user command.

10. The system according to claim 1, wherein the long-running operation is an operation having a completion time longer than a lifetime of the operator module.

11. A method for processing database requests, comprising:

providing a cluster including a master node and a worker node, the master node having an operator module in the form of a first point of delivery (POD) and a worker node having a database module in the form of a second POD;

receiving at a controller container of the operator module a request requiring at least one long running operation;

assigning, by the controller container, an operation identification (ID) to the long running operation and communicating, by the controller container, the request and operation ID in the form of a remote procedure call (RPC), wherein when the request necessitates a multiple of operations assigning comprises assigning respective operation IDs to those of the operations that are long running operations and only to those of the operations that are long running operations;

passing the request and the operation ID to a database daemon container of the database module;

launching the long running operation using the database daemon container;

storing a state of the long running operation in the database daemon container; and reporting, using the database daemon container, a status of the long running operation, wherein the database module further comprises a database container, a log sidecar container, and a job container, and wherein the database daemon container performs servicing of the request by employing the job container to search for and retrieve data from the database container while the log sidecar container tracks events that occur during the servicing, wherein the database daemon container is operable to receive the request and operation ID, register the long running operation as a new operation by performing a register new operation, launch the long running operation as a goroutine, and report the status of the long running operation to the master node automatically upon completion of the long running operation, with the report including the operation ID, and wherein performing the register new operation comprises defining a location to store state parameters of the long running operation, associating the location with the operation ID, and setting an initial completion status of the long running operation to not done.

12. The method according to claim 11, wherein the cluster is a Kubernetes cluster, the operator module is in the form of a first Kubernetes POD, and the database module is in the form of a second Kubernetes POD.

13. The method according to claim 11, wherein the database daemon container is operable to receive the request and operation ID in the form of a long running operation gRPC, and report the status of the long running operation in response to receipt of a status gRPC generated automatically or in response to a user command.

14. The method according to claim 11, wherein the long-running operation is an operation having a completion time longer than a lifetime of the operator module.

15. A non-transitory computer-readable medium having stored thereon a computer-readable program for performing a method for processing database requests, the method comprising:

providing a cluster including a master node and a worker node, the master node having an operator module in the form of a first point of delivery (POD) and a worker node having a database module in the form of a second POD;

receiving at a controller container of the operator module a request requiring at least one long running operation;

assigning, by the controller container, an operation iden-
tification (ID) to the long running operation and com-
municating, by the controller container, the request and
operation ID in the form of a remote procedure call
(RPC), wherein when the request necessitates a mul-
tiple of operations assigning comprises assigning
respective operation IDs to those of the operations that
are long running operations and to only to those of the
operations that are long running operations;

passing the request and the operation ID to a database
daemon container of the database module;

launching the long running operation using the database
daemon container;

storing a state of the long running operation in the
database daemon container; and reporting, using the database daemon container, a status of
the long running operation, wherein the database module further comprises a database
container, a log sidecar container, and a job container,
and wherein the database daemon container performs
servicing of the request by employing the job container
to search for and retrieve data from the database
container while the log sidecar container tracks events
that occur during the servicing, wherein the database daemon container is operable to
receive the request and operation ID, register the long
running operation as a new operation by performing a register new operation, launch the long running opera-
tion as a goroutine, and report the status of the long
running operation to the master node automatically
upon completion of the long running operation, with
the report including the operation ID, and wherein performing the register new operation comprises
defining a location to store state parameters of the long
running operation, associating the location with the
operation ID, and setting an initial completion status of
the long running operation to not done.

16. The non-transitory computer-readable medium
according to claim 15, wherein the cluster is a Kubernetes
cluster, the operator module is in the form of a first Kuber-
netes POD, and the database module is in the form of a
second Kubernetes POD.

17. The non-transitory computer-readable medium
according to claim 15, wherein the database daemon con-
tainer is operable to receive the request and operation ID in
the form of a long running operation gRPC, and report the
status of the long running operation in response to receipt of
a status gRPC generated automatically or in response to a
user command.

18. The non-transitory computer-readable medium
according to claim 15, wherein the long-running operation is
an operation having a completion time longer than a lifetime
of the operator module.

* * * * *